(12) United States Patent
Wilbers et al.

(10) Patent No.: US 11,532,097 B2
(45) Date of Patent: Dec. 20, 2022

(54) METHOD FOR ESTIMATING THE QUALITY OF LOCALIZATION IN THE SELF-LOCALIZATION OF A VEHICLE, DEVICE FOR CARRYING OUT THE STEPS OF THE METHOD, VEHICLE, AND COMPUTER PROGRAM

(71) Applicants: VOLKSWAGEN AKTIENGESELLSCHAFT, Wolfsburg (DE); MAN TRUCK & BUS SE, Munich (DE)

(72) Inventors: Daniel Wilbers, Wolfsburg (DE); Christian Merfels, Braunschweig (DE); Bernd Rech, Bokensdorf (DE); Thilo Schaper, Lehrte (DE); Niklas Koch, Wolfsburg (DE); Stefan Jürgens, Braunschweig (DE); David Perdomo Lopez, Braunschweig (DE); Constanze Hungar, Braunschweig (DE)

(73) Assignee: Volkswagen Aktiengesellschaft

( * ) Notice: Subject to any disclaimer, the term of this patent is extended or adjusted under 35 U.S.C. 154(b) by 45 days.

(21) Appl. No.: 17/262,315

(22) PCT Filed: Jul. 25, 2019

(86) PCT No.: PCT/EP2019/070063
§ 371 (c)(1),
(2) Date: Jan. 22, 2021

(87) PCT Pub. No.: WO2020/021022
PCT Pub. Date: Jan. 30, 2020

(65) Prior Publication Data
US 2021/0341310 A1 Nov. 4, 2021

(30) Foreign Application Priority Data

Jul. 27, 2018 (DE) ...................... 10 2018 118 220.1

(51) Int. Cl.
*G06T 7/70* (2017.01)

(52) U.S. Cl.
CPC ...................................... *G06T 7/70* (2017.01)

(58) Field of Classification Search
CPC .......... G06T 7/70; G01C 21/30; G01C 21/26; G05D 1/0274
See application file for complete search history.

(56) References Cited

U.S. PATENT DOCUMENTS 9,707,961 B1 * 7/2017 Halder ................ G05D 1/0274
10,591,304 B2 3/2020 Knorr et al.
(Continued)

FOREIGN PATENT DOCUMENTS

DE 102011119762 A1 * 6/2012 ........... G01C 21/165
DE 102011119762 A1 6/2012
(Continued)

OTHER PUBLICATIONS

DE-102015220360-A1_Translated (Year: 2017).*
(Continued)

*Primary Examiner* — Natalie Huls
*Assistant Examiner* — Michael J Singletary
(74) *Attorney, Agent, or Firm* — Barnes & Thornburg, LLP

(57) ABSTRACT

A method for estimating the quality of localization using sensor detection, wherein the vehicle detects dynamic objects on the road and in the direct surroundings of the road and estimates the dimensions of the objects. The movement of these objects in the near future is estimated. The outer casings of these objects are entered into a map of the surroundings. From the perspective of the sensors used to detect the features in the surroundings, the limitations of the fields of view and the predicted temporal development thereof resulting from the movement of the transportation (Continued)

vehicle and the predicted movements of the objects are entered into the map of the surroundings. The surrounding features that have been entered into the map of the surroundings and which may at visible in the near future are determined. An upper limit for a measure of the quality of localization is estimated.

16 Claims, 6 Drawing Sheets

(56) References Cited

U.S. PATENT DOCUMENTS

| | | | |
|---|---|---|---|
| 2017/0108865 | A1 | 4/2017 | Rohde et al. |
| 2017/0261325 | A1 | 9/2017 | Schroeder et al. |
| 2021/0341310 | A1* | 11/2021 | Wilbers ................. G01C 21/30 |

FOREIGN PATENT DOCUMENTS

| | | | | |
|---|---|---|---|---|
| DE | 102015010542 | A1 | 2/2016 | |
| DE | 102014217847 | A1 | 3/2016 | |
| DE | 102015220360 | A1 * | 4/2017 | ............. B60K 28/06 |
| DE | 102015220360 | A1 | 4/2017 | |
| DE | 102017101466 | A1 | 8/2017 | |
| DE | 102016203723 | A1 | 9/2017 | |
| DE | 102017004721 | A1 | 12/2017 | |
| DE | 102016225213 | A1 | 6/2018 | |
| WO | 2017028994 | A1 | 2/2017 | |
| WO | WO-2019166221 | A1 * | 9/2019 | ............. G01C 21/30 |

OTHER PUBLICATIONS

DE-102011119762-A1_Translated (Year: 2012).*
WO-2019166221-A1_Translated (Year: 2019).*
3GPP; LTE; Evolved Universal Terrestrial Radio Access (E-UTRA); Physical layer procedures; TS 136 213; version 13.0.0, release 13; 2016.
Search Report for International Patent Application No. PCT/EP2019/070063; dated Jan. 10, 2020.

* cited by examiner

METHOD FOR ESTIMATING THE QUALITY OF LOCALIZATION IN THE SELF-LOCALIZATION OF A VEHICLE, DEVICE FOR CARRYING OUT THE STEPS OF THE METHOD, VEHICLE, AND COMPUTER PROGRAM

PRIORITY CLAIM

This patent application is a U.S. National Phase of International Patent Application No. PCT/EP2019/070063, filed 25 Jul. 2019, which claims priority to German Patent Application No. 10 2018 118 220.1, filed 27 Jul. 2018, the disclosures of which are incorporated herein by reference in their entireties.

SUMMARY

Illustrative embodiments relate to a method for estimating the quality of localization in the self-localization of a transportation vehicle, a device for use in the method, a transportation vehicle having the device, and a computer program to carry out the method.

BRIEF DESCRIPTION OF THE DRAWINGS

Exemplary embodiments are shown in the drawings and are explained in detail below on the basis of the figures, wherein.

DETAILED DESCRIPTION

Figure 1:
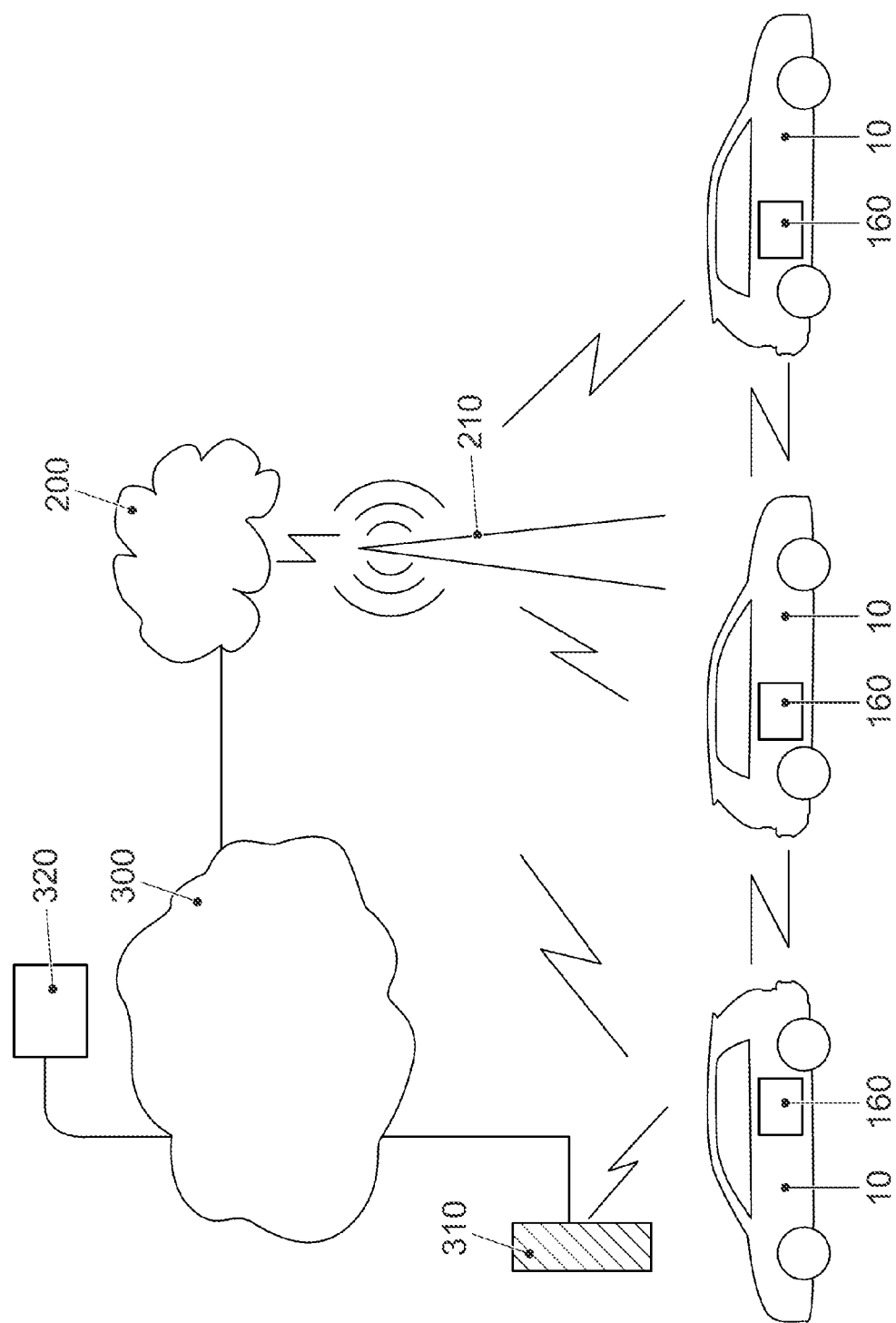
FIG. 1 shows a representation of the entire system with a number of fleet vehicles which are connected via mobile radiocommunication to the Internet and communicate with a backend server which is accessible on the Internet.

Autonomous driving systems will be used in transportation vehicles in the near future, whereby the driver will no longer be constantly occupied with the task of driving and can carry out secondary activities (reading, sleeping, writing messages, etc.).

Autonomous driving (sometimes also referred to as automatic driving, automated driving or piloted driving) is to be understood to mean the movement of transportation vehicles, mobile robots and driverless transport systems which behave largely autonomously. The concept of autonomous driving has various gradations. At certain levels, autonomous driving also refers to a situation in which a driver is still present in the transportation vehicle and, where appropriate, performs only the monitoring of the automatic driving process. In Europe, the different traffic ministries (in Germany, the Bundesanstalt für Straßenwesen ["Federal Highway Research Institute"] participated) have collaborated and defined the following autonomy levels:

Level 0: "driver only", the driver himself drives, steers, accelerates, brakes, etc.

Level 1: specific assistance systems help with transportation vehicle operation (inter alia, an Automatic Cruise Control ACC).

Level 2: partial automation. Inter alia, automatic parking, lane-keeping function, general longitudinal guidance, acceleration, braking, etc. are performed by the assistance systems (including congestion assistant).

Level 3: high-level automation. The driver does not have to monitor the system constantly. The transportation vehicle independently performs functions such as activating the indicator, lane-changing and lane-keeping. The driver can apply himself to other tasks, but, if required, is prompted by the system within a warning time to take over the driving. This form of autonomy is technically feasible on highways. The legislative authority is working on the approval of Level 3 vehicles. The legal boundary conditions have already been established for this purpose.

Level 4: full automation. The driving of the transportation vehicle is performed constantly by the system. If the system can no longer cope with the driving tasks, the driver can be prompted to take over the driving.

Level 5: no driver required. Apart from setting the destination and starting the system, no human intervention is required.

The Verband der Automobilindustrie (VDA) ["German Automotive Industry Association"] has also published its own definition of the different levels for the degree of automation.

Automated driving functions from level 3 remove responsibility for controlling the transportation vehicle from the driver. Self-localization of the transportation vehicle is hugely important for automated driving systems of this type. Position determination based on the known GNSS systems, corresponding to the Global Navigation Satellite System, such as GPS (Global Positioning System), is inadequate for this purpose. Very precise maps of a surrounding area are used in the automated driving systems to increase the accuracy of the position determination. The transportation vehicle "scans" the surrounding area, wherein imaging sensors such as video cameras, infrared cameras, LIDAR (Light Detection and Ranging) sensors, RADAR (Radio Detection and Ranging) sensors and ultrasound sensors are used for this purpose. The distances to specific features of the surrounding area recorded in the map, which are also referred to as landmarks, are determined through evaluation of the images captured by the sensors. This then results in an improved accuracy in the self-localization. More recent autonomous functions or the more recent driver assistance systems, such as a "road works assistant", can therefore then be implemented.

Various concepts are already known for the self-localization of automatically driving transportation vehicles. In some concepts, static structures and patterns in the surrounding area of the transportation vehicle are detected by the transportation vehicle sensors and are compared with corresponding entries in a map which is available in the transportation vehicle (e.g., landmark-based localization, Road DNA from TOMTOM®, Road Data Base from cooperation partners Conti-Ygomi, etc.). These concepts require a map that is as precise and up-to-date as possible with the recorded features of the surrounding area. They further require the visibility to the transportation vehicle sensors of the features of the surrounding area used by them. The quality of the localization is correspondingly dependent on the availability of detectable features of the surrounding area and the precision of the detection and the precision of the map entries.

A method for creating a digital map of a surrounding area is known from DE 10 2015 010 542 A1. Objects or obstacles are detected by environment sensors. A route actually travelled by the transportation vehicle is compared with a route in the map of the surrounding area and updated map information is generated on the basis thereof and is stored in the map of the surrounding area.

A method for localizing an automated transportation vehicle is known from WO 2017/028994 A1. The method comprises the following operations: predefining a localization accuracy to be achieved for the automated transportation vehicle, acquiring data for the surrounding area of the automated transportation vehicle by a sensor device of the automated transportation vehicle and linking the acquired data for the surrounding area with location information; localizing the automated transportation vehicle by the localization reference data and the acquired data for the surrounding area, wherein an achieved localization accuracy is signaled. Functionalities of the automated transportation vehicle can be deactivated in the event that a localization accuracy is not achieved with the available localization reference data.

A method for position determination of a transportation vehicle is known from DE 10 2011 119 762 A1. The position determination in the transportation vehicle is performed by a combination of absolute position determination by landmarks recorded in a digital map, supported by an interpolating coupling measurement by an inertial sensor system IMU, if necessary supported by odometers a.

In the context of automatic driving, the quality of localization is a safety-relevant criterion for different transportation vehicle functions. If, for example, it is foreseeable that the transportation vehicle can no longer be localized with sufficient accuracy, a situation-depended response of the transportation vehicle is possible. For example, a driver can be prompted in a timely manner to take control, or the transportation vehicle can reduce its speed or can independently perform a stopping maneuver. It is therefore essential to estimate the present and future quality of localization.

The disclosed embodiments provide a solution to the problem of estimating the quality of localization to be expected in future.

This is achieved by a method for estimating the quality of localization in the self-localization of a transportation vehicle, a device for carrying out the method, a transportation vehicle, and a computer program.

The proposal relates to the problem of estimating the quality of localization to be expected in future. This is determined by the future visibility of the features of the surrounding area. The quality of localization is typically dependent on the number of visible features of the surrounding area and on their spatial distribution. It can generally be stated that the more features of the surrounding area there are available for the comparison with the map and the better their spatial distribution, the better the quality of localization will be. A quality measure can be predicted for the route ahead from the knowledge of the features of the surrounding area (number and spatial distribution) which are presumably visible to the transportation vehicle sensors during the journey.

The term "feature of the surrounding area" generally relates to characteristic features in the surrounding area of an object. The term "landmark" is often used synonymously below. The term "landmark" is often understood to mean a clearly visible feature of the surrounding area. Examples of landmarks include a deployed maritime aid to navigation such as a lighthouse or other conspicuous, usually highly visible, topographical object. Churches, towers, wind turbines, castles, mountains or free-standing, distinctive tall trees, for example, can accordingly represent landmarks. They play an important part in spatial orientation and terrestrial navigation and are therefore indicated, where appropriate, on maps by special map symbols. However, this may also include a feature of the surrounding area that is clearly visible on the roadway, such as roadway markings on the roadway, e.g., traffic lane markings, direction arrows, stop lines, etc.

In one design, the proposal relates to a method for estimating the quality of localization in the self-localization of a transportation vehicle in which a map of the surrounding area is used for the self-localization, the map being used in controlling the transportation vehicle, wherein a transportation vehicle, when driving on a road, attempts to detect a number of landmarks recorded in the map of the surrounding area using sensors and determines the position of the transportation vehicle itself from the position of the number of landmarks. In the method, according to the proposal, the future visibility of landmarks is determined in the transportation vehicle and the quality of localization for the future self-localization of the transportation vehicle is estimated depending on the future visibility of the landmarks. The quality of localization is important information which is used in assessing whether the automatic driving function can be operated in a safe state. If the automatic driving function is estimated in such a way that it no longer meets the required safety criteria, it must either be deactivated and the driver of the transportation vehicle is prompted to take charge of the control function, or other measures are taken, such as braking the transportation vehicle till it stops, steering the transportation vehicle to the roadside or onto a parking space or an emergency stopping bay, warning the driver and/or other road users, etc. The proposal therefore relates to a safety-relevant facet for implementing an automatic driving function and significant importance is attached to it for this reason alone.

In at least one disclosed embodiment of the method, the operation for determining the future visibility of landmarks comprises detecting obstacles which restrict the visibility of landmarks. Obstacles could be immovable obstacles such as buildings or other structures, or natural obstacles such as mountains, trees, rocky outcrops. Moving objects such as transportation vehicles of other road users also exist.

Whereas the immovable obstacles are typically detected in such a way that they are recorded in the map of the surrounding area and the corresponding details are taken from the map of the surrounding area for the detection, at least one disclosed embodiment of the method relates to the detection of moving obstacles on the roadway and optionally in the surrounding area of the roadway using sensors for the operation of detecting obstacles. The detection of moving obstacles is important, since the transportation vehicles having an automatic driving function use the public road network where dense traffic frequently prevails, so that concealment by other road users is a principal cause of restriction of visibility of landmarks.

In a further design of the method, the determining the future visibility of landmarks further comprises estimating movement trajectories of the moving obstacles. This is necessary for being able to assess the future visibility of landmarks.

It is therefore then also possible to record the projected positions of the moving obstacles in the map of the surrounding area. This makes the method particularly efficient. The map of the surrounding area is used in any event for the self-localization. If the moving obstacles as well as the immovable obstacles are then also recorded therein, no substantial modification needs to be made to the algorithm which calculates the self-localization.

It is beneficial here for increasing accuracy if the operation of recording the projected positions of the moving obstacles in the map of the surrounding area comprises recording the spatial extent of the obstacles.

It is also beneficial in this respect if the operation for determining the future visibility of landmarks further comprises estimating the future visibility of a sensor of the transportation vehicle. A time is determined at which the future visibility is to be assessed. The future sensor position is determined with the known movement trajectory of the transportation vehicle itself. The visibility of the sensor of the transportation vehicle is then determined for this position.

Thereafter, the visibility of the landmarks which are to be observed in future by the sensor on the basis of the determined future visibility range can then be determined.

Finally, in at least one disclosed embodiment, the quality of localization in the self-localization of the transportation vehicle is determined depending on the number of landmarks which are to be observed in future. This is particularly simple to implement, without causing substantial computing outlay.

In another disclosed embodiment, the quality of localization is determined through statistical evaluation of the landmarks which are to be observed in future, taking account of the position of the landmarks in relation to one another.

This can be done by calculating the covariance of the positions of the landmarks which are to be observed in relation to one another and in relation to the position of the transportation vehicle.

To summarize, in at least one disclosed embodiment, the method can comprise the following operations:

1. The automatic transportation vehicle uses sensors to detect dynamic and static objects on the road and in the immediate vicinity of the road, e.g., other vehicles, obstacles, and estimates their dimensions. Enveloping cubes with length, width and height specifications can be defined for this purpose.

2. The movement of these envelopes in the near future is estimated.

3. The envelopes of these objects are recorded in a map of the surrounding area.

4. The restrictions of the visibility ranges and their predicted changes over time due to the movement of the transportation vehicle itself and the predicted movements of the dynamic objects are recorded in the map of the surrounding area from the perspective of the sensors which serve to detect the features of the surrounding area.

5. The features of the surrounding area recorded in the map of the surrounding area which may at best be visible in the near future are determined.

6. An upper limit for a quality measure of the localization is estimated.

In practice, some of the features of the surrounding area recorded in the map and not affected by the concealment prediction described above will nevertheless not be detected. The reasons may be that some features of the surrounding area are nevertheless concealed, cannot be recognized by the sensors due to unfavorable conditions (e.g., unfavorable weather conditions), or no longer exist. The actual quality of localization may therefore be lower in practice than the upper limit of the quality measure.

For a device for carrying out the method according to the proposal, it is beneficial if the device is equipped with at least one processor device which is configured to carry out the corresponding method operations.

A further disclosed embodiment comprises a transportation vehicle which has a corresponding device to carry out the method.

The proposal can further be implemented as a computer program. This computer program has a program code which is executed in a processor device and carries out the claimed method.

The present description illustrates the principles of the disclosure. Persons skilled in the art will therefore obviously be capable of designing a variety of arrangements which are not explicitly described here, but embody principles of the disclosure and are similarly intended to be fully protected.

FIG. 1 shows the connection of transportation vehicles 10 via mobile radiocommunication to the Internet 300 and to an external central computing unit 320, referred to below as a backend server, which is accessible on the Internet 300.

Vehicle communication, also direct vehicle-to-vehicle communication, and possibly also vehicle-to-infrastructure communication, are required for the domains of cooperative driving maneuvers or autonomous driving. All three different communication types are shown in FIG. 1. The connection to the Internet 300 is established via mobile radiocommunication. A communication module 160 installed in the transportation vehicle 10 communicates with a mobile radiocommunication base station 210 in whose coverage area the transportation vehicle 10 is travelling. The base station 210 is connected via an EPC network 200 of the mobile radiocommunication operator, corresponding to Evolved Packet Core, to the Internet 300. The transportation vehicle 10 can thus communicate with the backend server 320 which is accessible on the Internet 300.

Mobile radiocommunication technologies of this type are standardized and reference is made here to the corresponding specifications of mobile radiocommunication standards. The 3GPP initiative and the LTE (Long Term Evolution) standard are cited here as a modern example of a mobile radiocommunication standard. Many of the associated ETSI specifications are currently available in version 14. The following can be mentioned as an example from version 13: ETSI TS 136 213 V13.0.0 (2016-05); this involves Evolved Universal Terrestrial Radio Access (E-UTRA); Physical Layer (3GPP TS 36.213 Version 13.0.0 Release 13).

LTE represents high data rates and short response times. The increase in the data rate is achieved in LTE through improved modulation methods, more flexible frequency usage and wider channel bandwidths. According to the specification, LTE currently has a data rate of more than 300 Mbit/s in the downlink and 75 Mbit/s in the uplink per 20 MHz band, mathematically and less overhead.

If the transportation vehicles need to exchange data with one another, vehicle-to-vehicle communication takes place. Different communication systems are available for this purpose. Examples include WLAN-based vehicle direct communication according to the IEEE 802.11p standard and vehicle direct communication in the mobile radiocommunication networks domain. In the fourth-generation mobile radiocommunication standard, corresponding to Long Term Evolution LTE, this is referred to as LTE-V, in the case of the 5G initiative, this is referred to as D2D, corresponding to device-to-device communication. In addition, vehicle-to-infrastructure communication also exists. Here, a transportation vehicle communicates with the infrastructure components, e.g., the road-side units RSU 310. If these infrastructure components are also connected to the backend server 320, communication with the backend server 320 can also take place via vehicle-to-infrastructure communication.

Figure 2:
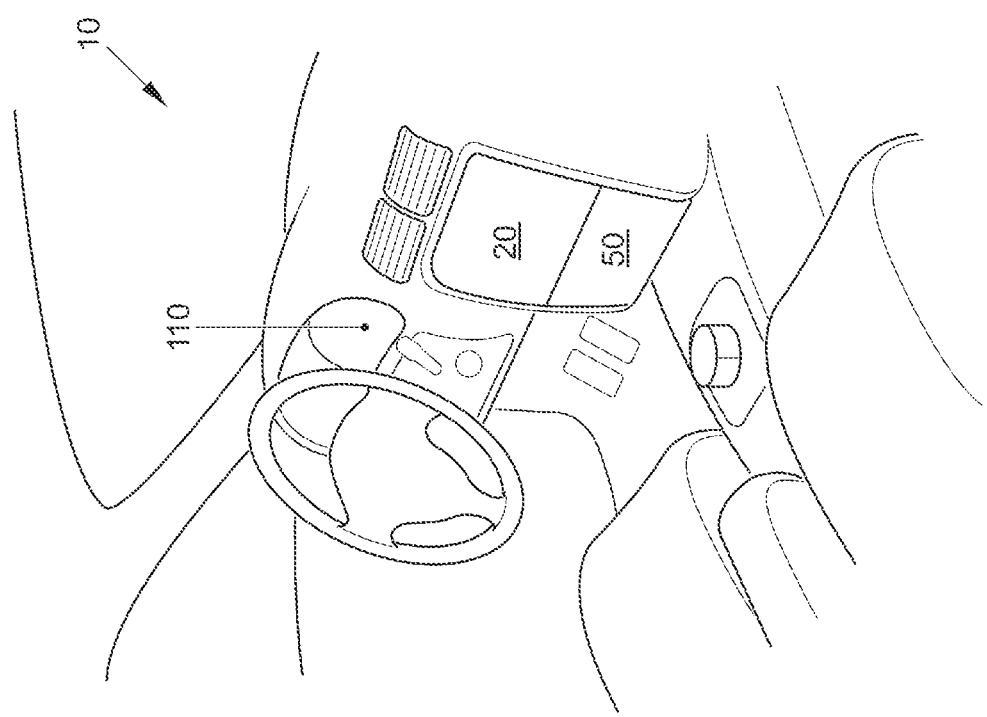
FIG. 2 shows the typical cockpit of a transportation vehicle.

FIG. 2 shows the typical cockpit of a transportation vehicle 10. A passenger transportation vehicle is represented. However, any other vehicles could similarly be conceivable as the transportation vehicle 10. Examples of further vehicles are: Bicycles, motorcycles, buses, goods vehicles, in particular, trucks, agricultural vehicles, construction vehicles, rail vehicles, etc. The use of the exemplary embodiments would generally be possible in the case of agricultural vehicles, including robots, rail vehicles, watercraft and aircraft, including drones.

In the case considered, it is assumed that the transportation vehicle 10 is equipped with one or more driver assistance systems and provides a degree of automation from level 3 according to the VDA definition. One essential component of the cockpit is a display unit 20 of an infotainment system. This is a touchscreen 20 which is mounted in the central console. The touchscreen 20 serves to operate functions of the transportation vehicle 10. For example, a radio, a navigation system, a playback of stored music pieces and/or an air conditioning system, other electronic devices or other comfort functions or applications of the transportation vehicle 10 can be controlled via the screen. These are often referred to collectively as an "infotainment system". In transportation vehicles, specifically passenger transportation vehicles, an infotainment system refers to the combination of car radio, navigation system, hands-free device, driver assistance systems and further functions in a central operating unit. The term infotainment is a portmanteau, made up of the words information and entertainment. The touchscreen 20 is mainly used to operate the infotainment system, wherein this screen 20 can be easily viewed and operated, particularly by a driver of the transportation vehicle 10, but also by a front-seat passenger of the transportation vehicle 10. Mechanical operating elements, for example, buttons, rotary controls or combinations thereof, such as, for example, rotary/push-button controls, can further be arranged in an input unit 50 below the screen 20. A steering wheel operation of parts of the infotainment system is typically also possible. For this purpose, the transportation vehicles 10 are equipped with a multifunction steering wheel control. This unit is not shown separately, but is considered as part of the input unit 50. The large illustrated rotary/push-button control in the lower part of the central console is also considered as part of the input unit.

Figure 3:
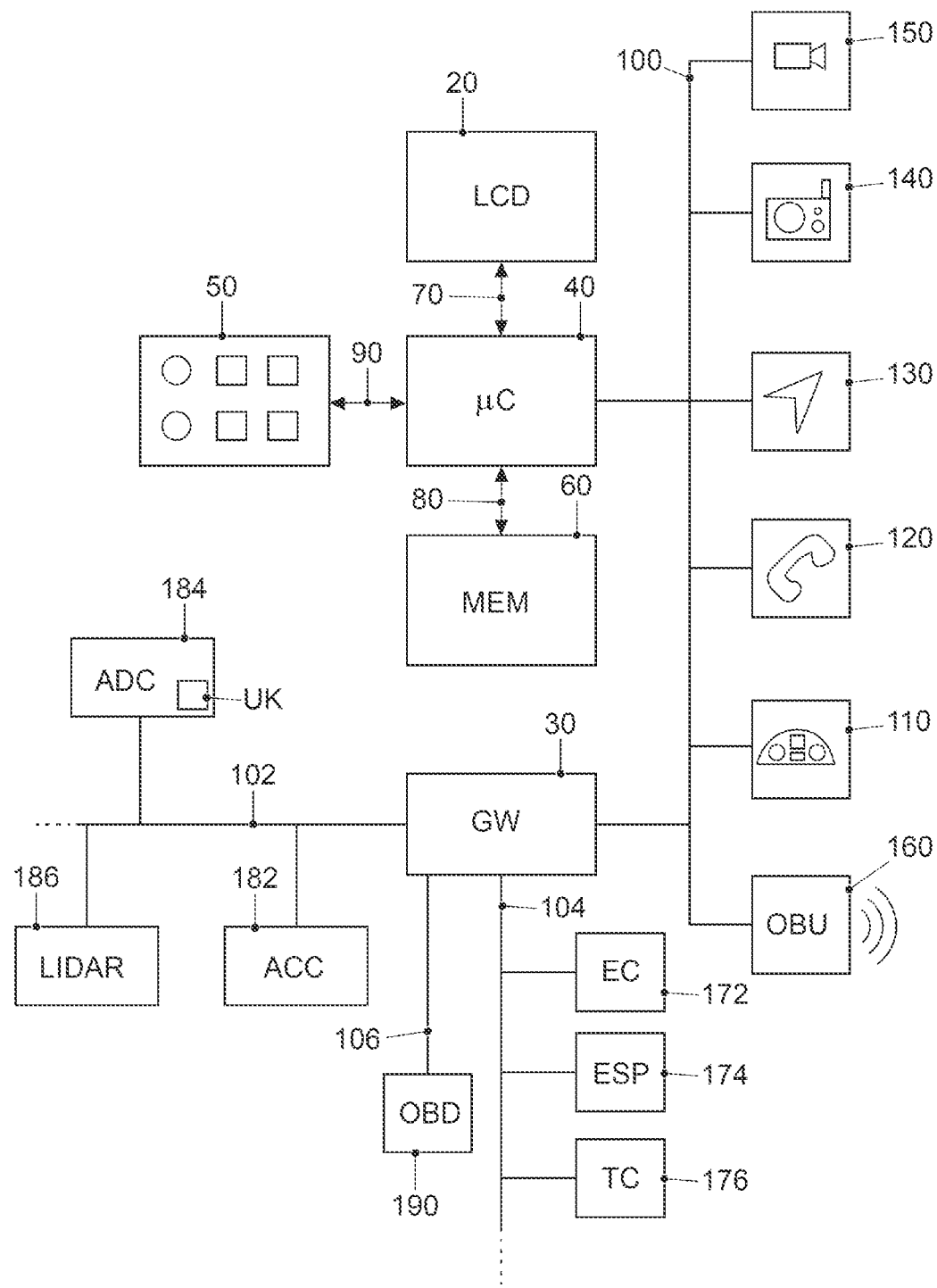
FIG. 3 shows a block diagram of the automotive electronics of the transportation vehicle.

FIG. 3 shows schematically a block diagram of the automotive electronics and, by way of example, some subsystems or applications of the infotainment system. Along with further components, the infotainment system comprises: the touch-sensitive display unit 20, a computing device 40, an input unit 50 and a memory 60. The display unit 20 comprises both a display area for displaying variable graphical information and a user interface (touch-sensitive layer) arranged above the display area for the input of commands by a user.

The display unit 20 is connected via a data line 70 to the computing unit 40. The data line can be designed according to the LVDS standard, corresponding to Low Voltage Differential Signaling. The display unit 20 receives control data from the computing device 40 via the data line 70 to control the display area of the touch screen 20. Control data of the entered commands are also transmitted via the data line 70 from the touchscreen 20 to the computing device 40. The input unit is denoted by the reference number 50. The operating elements already mentioned, such as buttons, rotary controls, slide controls or rotary/push-button controls by which the operating person can make inputs via the menu guidance are associated with the input unit. The term "input" is generally understood to mean entering a selected menu option, and also modifying a parameter, activating and deactivating a function, etc.

The storage device 60 is connected via a data line 80 to the computing unit 40. A pictogram directory and/or symbol directory is/are stored in the memory 60 with the pictograms and/or symbols for possible displays of additional information.

The further components of the infotainment system, i.e., the camera 150, radio 140, navigation device 130, telephone 120 and instrument cluster 110 are connected via the data bus 100 to the device for the operation of the infotainment system. The high-speed option of the CAN bus according to the ISO 11898-2 standard can be considered as the data bus 100. Alternatively, for example, the use of a bus system based on Ethernet technology, such as IEEE 802.03cg, could also be considered. Bus systems in which the data transmission takes place via optical waveguides are also usable. The MOST (Media Oriented System Transport) bus or the D2B (Domestic Digital Bus) are mentioned as examples. The transportation vehicle 10 is equipped with a communication module 160 for wireless internal and external communication. This module is also often referred to as an on-board unit or on-board connectivity unit. It can be designed for mobile radiocommunication, e.g., according to the LTE Standard, corresponding to Long Term Evolution. It can similarly be designed for WLAN communication, corresponding to Wireless LAN, either for communication with devices of the occupants of the transportation vehicle or for vehicle-to-vehicle communication, etc.

The communication bus 100 of the infotainment system is connected to a gateway 30. The other parts of the automotive electronics are also connected thereto. On the one hand, this concerns the communication bus 104 of the powertrain which is typically implemented as the CAN bus. The control units of the powertrain, i.e., the engine control unit 172, the ESP control unit 174 and the transmission control unit 176 are mentioned and shown as examples. This further concerns the communication bus 102 for driver assistance systems which can be designed as the FLEXRAY® bus. Two driver assistance systems are shown: a driver assistance system 182 for adaptive cruise control ACC, an automatic driving control unit 184 which performs an automatic driving function with automatic steering, and a LIDAR (Light Detection and Ranging) sensor 186. Furthermore, a communication bus 106 is also connected to the gateway 30. This bus connects the gateway 30 to an on-board diagnostic interface 190. The gateway 30 is responsible for performing the format conversions for the different communication systems 100, 102, 104, 106 so that the systems can exchange data with one another. In the example embodiment shown, the driver assistance system 184 makes use of a very precise map of the surrounding area for the driving task. In a first exemplary embodiment, the map of the surrounding area can be stored in advance in a memory of the automatic driving control unit 184. For this purpose, it is normally loaded via the communication module 160, forwarded from the gateway 30 and written to the memory of the automatic driving control unit 184. In a different option, only a section of a map of the surrounding area is loaded and written to the memory of the automatic driving control unit 184. This enables a smaller memory to be provided in the automatic driving control unit 184 and reduces costs. The very precise map of a surrounding area can already mean several gigabytes of data for a country such as Germany.

The transportation vehicle 10 is equipped with the two environment sensors: the video camera 150 and the LIDAR sensor 186. Even a plurality of video cameras 150 (front camera, rear camera, side camera left, side camera right) are typically installed in the transportation vehicle 10. It is thus possible to generate an all-round view of the transportation vehicle 10 through image processing. The LIDAR sensor 186 is typically installed in the front area of the transportation vehicle 10 and detects the surrounding area in the direction of travel of the transportation vehicle 10. In addition, ultrasound sensors and RADAR sensors could also be used.

The aforementioned environment sensors which are capable of detecting the surrounding area of the transportation vehicle are to be used for different distances and different purposes. The following indications of range and purpose generally apply:

A stereo camera, range 500 m, serves to capture a 3D map, used for an automatic emergency braking assistant, lane change assistant, for traffic sign recognition and an ACC stop and go.

Camera, range 100 m, serves to capture a 3D map, used for an automatic emergency braking assistant, lane change assistant, for traffic sign recognition, an ACC stop and go, for frontal collision warning, automatic light control and a parking assistant.

Ultrasound sensor, range <10 m, parking assistant.

Radar sensor, range 20 cm to 100 m, used for an automatic emergency braking assistant, for automatic speed control, an ACC stop and go, a blind spot assistant, a cross-traffic alarm transmitter.

Lidar sensor, range 100 m, serves to capture a 3D map, used for an automatic emergency braking assistant.

Figure 4:
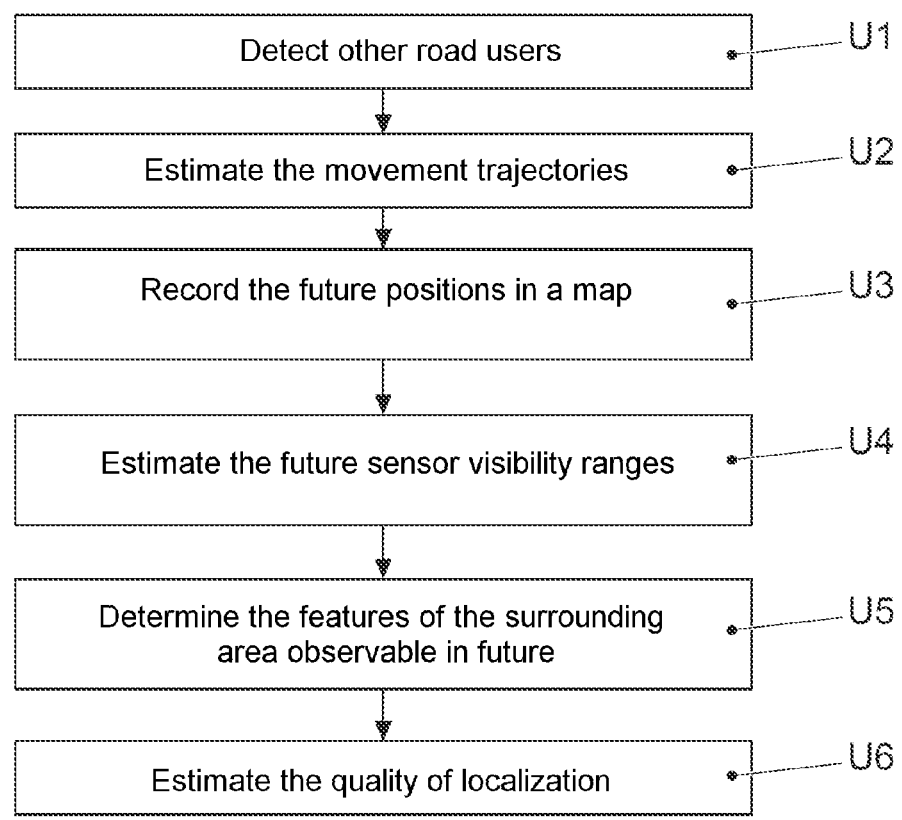
FIG. 4 shows the sequence of the method for determining the quality of localization according to a first exemplary embodiment.

The following method operations which are explained with reference to the flow diagram shown in FIG. 4 are carried out to assess the quality of localization.

The flow diagram for these operations can be regarded as a flow diagram for a computer program which is executed in a computing unit of the transportation vehicle 10. In at least one disclosed embodiment, the computing unit forms part of the driver assistance system 184. In a different option, the program is executed by the computing unit 40 of the infotainment system. The position of the transportation vehicle 10 is at least roughly known via the GNSS system. A landmark, for example, can be considered as a feature of the surrounding area. A landmark is understood here to mean a clearly visible feature of the surrounding area. It may be a naturally occurring, usually highly visible, topographical object such as a tree, rocky outcrop, mountaintop and the like. Other examples of landmarks concern structures such as churches, towers, wind turbines, castles. However, landmarks installed at the roadside, such as traffic lights, road signs, traffic signs, street lights, bridges, distance marks, edges of buildings are also cited as examples. The list is not definitive.

FIG. 4 shows the individual method operations which are carried out in the transportation vehicle 10 to estimate the quality of localization. In operation at U1, the other road users are detected. The environment sensor system installed in the transportation vehicle is used for this purpose. In the example shown in FIG. 3, the video camera 150 and the LIDAR sensor 186 are used. The detection also includes the image evaluation. The image evaluation is performed in a separate processor unit. In the case considered, the image evaluation would be performed in a processor unit of the automatic driving control unit 184. To do this, it is necessary to transmit the sensor data to the automatic driving control unit 184. The different bus systems and the gateway 30 are used for this purpose. The automatic driving system control unit 184 is equipped with a correspondingly sized memory in which the sensor data are temporarily stored.

Figure 5:
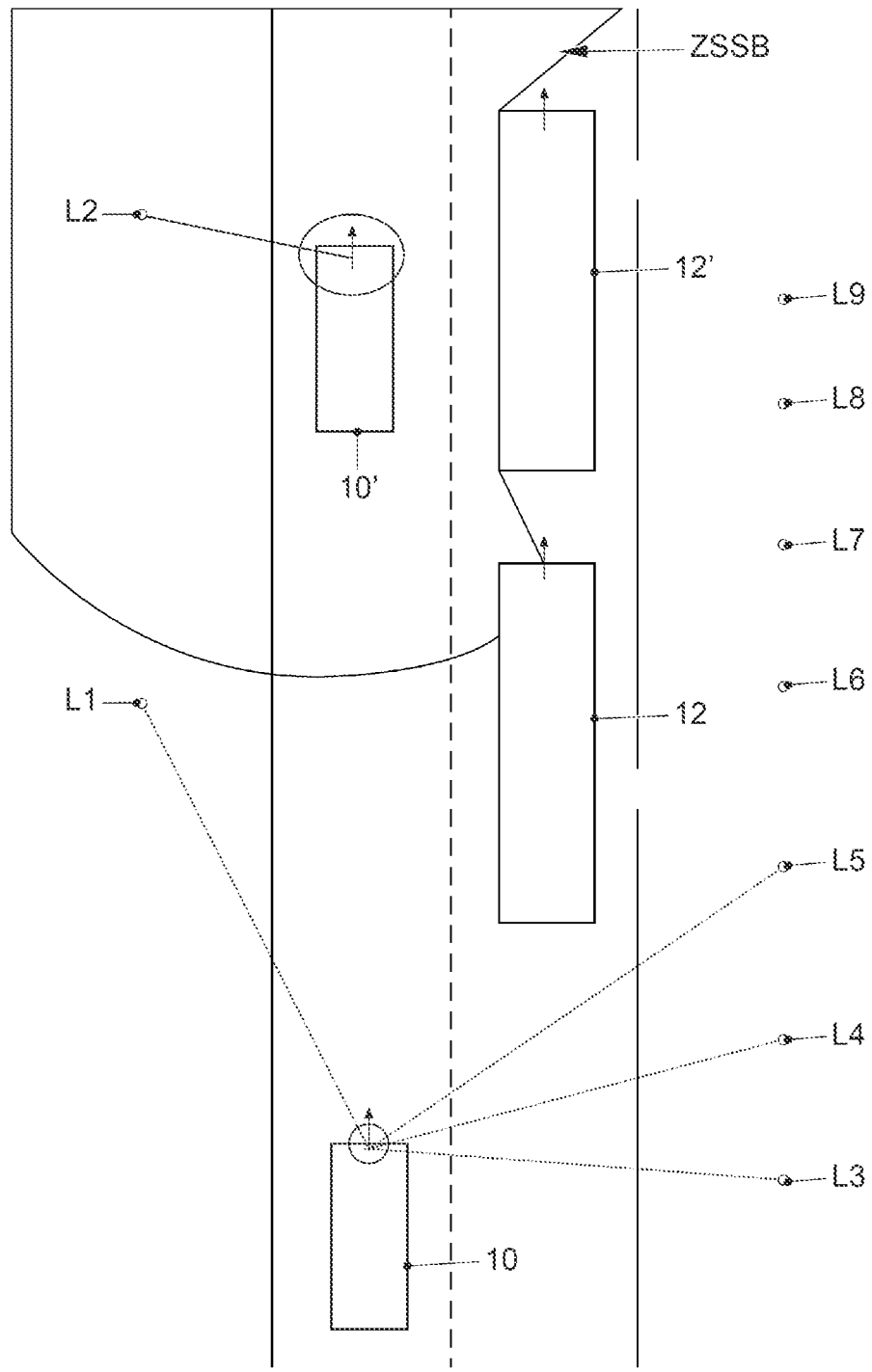
FIG. 5 shows an illustration of the determined future visibility of a sensor of the transportation vehicle which is used to estimate which landmarks will be visible in the future.

The journey on a roadway with two or more traffic lanes and dense truck traffic is intended to serve here as an illustrative example. This scenario is shown in FIG. 5. The trucks 12 will typically use the right-hand traffic lane and will be overtaken on the left-hand traffic lane by the lighter transportation vehicles 10. During the overtaking maneuver, the environment sensors of the automatic transportation vehicle 10 will recognize the trucks 12 driving ahead on the right-hand traffic lane. A multiple, temporally successive detection is performed. In another disclosed embodiment, further road users could also be detected. The transportation vehicles driving on the roadway in the opposite direction by which landmarks can similarly be concealed are mentioned in the first instance. Road users travelling on a parallel-running road are mentioned as a further example.

The movement of the trucks 12 driving ahead can therefore then also be estimated. This is done in method operation at U2. The movement trajectories of the detected trucks 12 driving ahead are determined there. The computing algorithms usable for this purpose are assumed to be known.

In operation at U3, the future positions of the detected transportation vehicles driving ahead are then recorded in the map of the surrounding area UK with an indication of the time which applies to the record. The size of the transportation vehicle 12 ahead is also recorded here in the map. Enveloping cubes with length, width and height specifications can be defined for this purpose. The aim is in fact for the automatic transportation vehicle 10 to estimate when it will no longer be able to detect landmarks on the right-hand side, see FIG. 5.

To be able to perform this task with high precision, the future sensor visibility range is also estimated in operation at U4. The position of the sensor is estimated for the future time. This is in fact derived from the movement trajectory of the transportation vehicle 10. The transportation vehicle knows through preconfiguration where the actual sensor position is in the transportation vehicle 10. The future sensor visibility range is shown in FIG. 5 and is denoted by the reference ZSSB. It is also recognizable there that none of the landmarks L3-L9 drawn on the right-hand side are located in the sensor visibility range ZSSB at the time shown. The sensor visibility range ZSSB has a certain extension in the respective direction. In the automatic driving control unit 184, the sensor visibility range ZSSB can be indicated quantitatively in an angle-dependent manner by storing a distance indication for different circle segments, indicating the distance from the sensor up to which the view is clear.

The sensor visibility range ZSSB is not completely shown upwards and to the left. To the right, the view is largely blocked by the nearby truck 12'. The reference number 12' denotes the projected, future position of the truck 12. Downwards, the extension of the sensor visibility range ZSSB is not particularly far. If the sensor is the video camera 150 which is installed as a front camera, it will normally have no rearward view at all. As already mentioned above, the detection of objects is typically possible up to a distance of 100 m.

After the sensor visibility range ZSSB has been determined, the future observable landmarks are determined in operation at U5. FIG. 5 again shows that only one landmark L2 is located on the left-hand side in the future sensor visibility range ZSSB.

Figure 6:
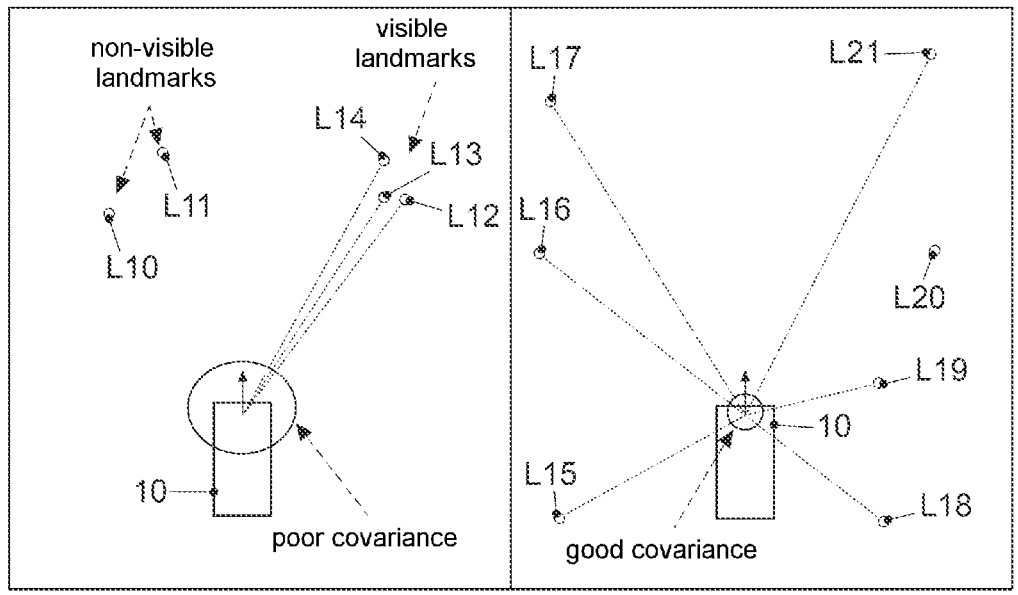
FIG. 6 shows an illustration of two examples of visible landmarks, one with a restricted view of the surrounding landmarks and the other with an unrestricted view of the surrounding landmarks.

Finally, in operation at U6, the quality of localization is also estimated. In the example embodiment shown, this estimation is based on the calculation of the covariance of the positions of the landmarks still to be observed, wherein the future position of the sensor 150 is assumed as the point of origin. The covariance is one of the statistical parameters and its calculation is assumed to be known. Two examples of possible distributions of the observable landmarks are shown in FIG. 6. In the left-hand part of FIG. 6, the landmarks visible in future are denoted by references L12-L14. The non-visible landmarks are denoted by references L10, L11. A dense concentration of visible landmarks can be seen in this part of FIG. 6. The calculation of the covariance provides a high value. The value would probably be greater than 1 and therefore indicates that the random samples are located close to one another. However, the position of the transportation vehicle 10 can only be determined relatively imprecisely therewith. In the right-hand part of FIG. 6, it is shown that more spatially separated landmarks L15-L19, L21 are located within the visibility range. If the covariance is calculated for this purpose, this produces a lower value which is probably less than 1. The position of the transportation vehicle 10 can thus be determined very precisely and the quality of localization is high. In this example embodiment, the quality of localization is represented directly by the covariance value. In a different example embodiment, the quality of localization is obtained from a table in which the quality of localization is listed for different ranges of covariance values.

Figure 7:
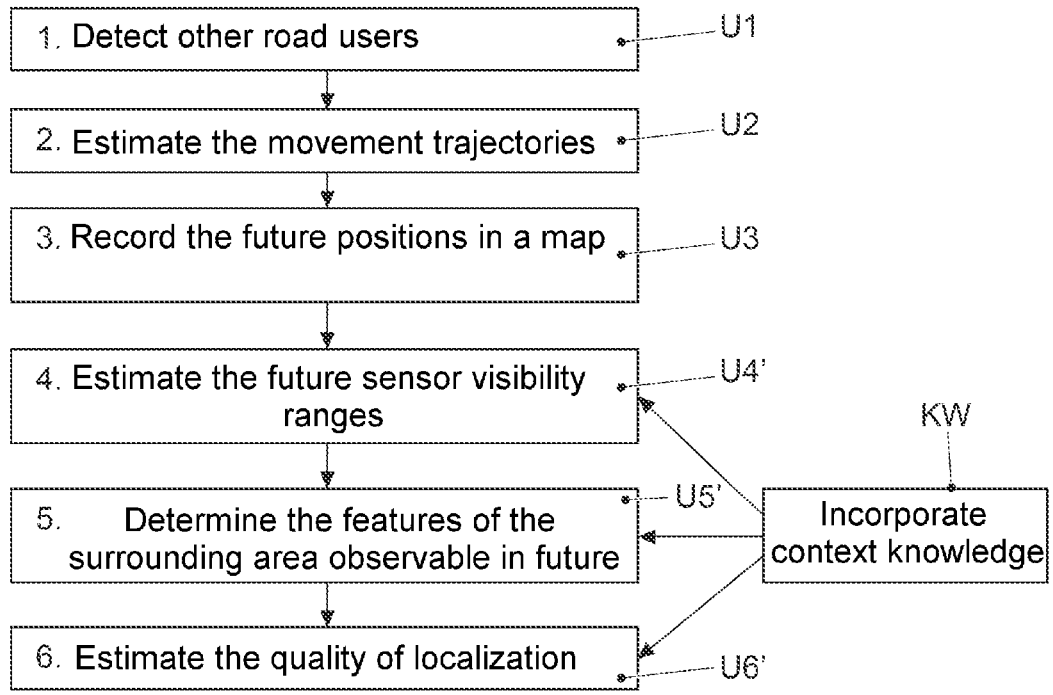
FIG. 7 shows the sequence of the disclosed method for determining the quality of localization according to a second exemplary embodiment.

FIG. 7 also shows a second example embodiment of the sequence of the method for estimating the quality of localization. The different operations at U1 to U6 similarly occur and do not therefore need to be explained again.

However, in this example embodiment, other features of the surrounding area are also used for the localization. Features of the surrounding area of this type also include, for example, road markings. The concealment of the features by objects is taken into account in the method described above. The additional problem of concealment by dirt, snow, leaves, etc. also occurs here. A prediction can also be made here in this option. This is based on context knowledge and the observations of the most recent past. The starting point is a map of the surrounding area UK with recorded road markings.

The context knowledge enables:
an assessment of whether a global recognition impairment is to be expected, e.g., due to snow;
an assessment of whether a global recognition impairment is to be expected, e.g., due to dirt on the road due to roadworks traffic.

The incorporation of the context knowledge is denoted by the reference KW in FIG. 7. The visibility ranges ZSSB to be expected, the features of the surrounding area observable in future and therefore the quality of localization are affected by this information. This corresponds to operations at U4', U5' and U6' in FIG. 7

The two options for the sequence of the method differ in terms of the type of features of the surrounding area that are used. Additional prior knowledge can be taken into account depending on the type. However, the principle of the visibility areas to be expected and the resulting estimation of the quality of localization remains the same. The alternative depends on the available sensor system of the transportation vehicle 10.

All examples mentioned herein and also conditional wordings are to be understood without restriction to such specifically cited examples. It will thus be acknowledged by person skilled in the art, for example, that the block diagram shown here represents a conceptual view of an example of a circuit arrangement. Similarly, it is to be recognized that an illustrated flow diagram, state transition diagram, pseudo-code and the like represent different options for representing processes which are essentially stored in computer-readable media and can therefore be executed by a computer or processor.

It should be understood that the proposed method and the associated devices can be implemented in various forms of hardware, software, firmware, special processors or a combination thereof. Special processors may comprise Application-Specific Integrated Circuits (ASICs), Reduced Instruction Set Computers (RISCs) and/or Field Programmable Gate Arrays (FPGAs). The proposed method and the device may be implemented as a combination of hardware and software. The software may be installed as an application program on a program storage device. This typically involves a machine based on a computer platform which has hardware, such as, for example, one or more central units (CPU), a random-access memory (RAM) and one or more input/output (I/O) interfaces. Furthermore, an operating system is typically installed on the computer platform. The different processes and functions that have been described here may form part of the application program, or a part which is run via the operating system.

The disclosure is not limited to the example embodiments described here. There is scope for various adaptations and modifications which the person skilled in the art, due to his technical knowledge, would also consider as belonging to the disclosure.

REFERENCE NUMBER LIST

10 Transportation vehicle
12 Truck (moving obstacle)
20 Touchscreen
30 Gateway
40 Computing unit
50 Input unit
60 Storage unit
70 Data line to the display unit
80 Data line to the storage unit
90 Data line to the input unit
100 1st data bus
102 2nd data bus
104 3rd data bus
106 4th data bus
110 Instrument cluster
120 Telephone
130 Navigation device
140 Radio 150 Camera
160 Communication module
172 Engine control unit
174 ESP control unit
176 Transmission control unit
182 ACC control unit
184 Automatic driving control unit
186 Lidar sensor
190 On-board unit diagnostic connector
200 Evolved Packet Core
210 Mobile radiocommunication base station
300 Internet
310 Radio beacon
320 Backend central computer
U1-U6' Different operations which are executed in the transportation vehicle
L1-L21 Landmarks
ZSSB Future visibility range

The invention claimed is:

1. A method for estimating a quality of localization in a self-localization of a transportation vehicle in which a map of a surrounding area is used for the self-localization, the map being used in controlling the transportation vehicle, the method comprising:
the transportation vehicle, when driving on a road, attempting to detect a number of landmarks recorded in the map of the surrounding area using sensors;
determining, by the transportation vehicle, a position of the transportation vehicle from positions of the number of landmarks;
determining, by the transportation vehicle, a future visibility of landmarks by:
detecting obstacles which restrict the visibility of landmarks, wherein detecting the obstacles comprises detecting moving obstacles on the roadway and optionally in the surrounding area of the roadway using sensors;
estimating movement trajectories of the moving obstacles; and
recording projected positions of the moving obstacles in the map of the surrounding area; and
estimating, by the transportation vehicle, the quality of localization in the self-localization of the transportation vehicle based on the visibility of the landmarks.

2. The method of claim 1, wherein recording the projected positions of the moving obstacles in the map of the surrounding area comprises recording a spatial extent of the moving obstacles.

3. The method of claim 1, wherein determining the future visibility of landmarks further comprises estimating a future visibility range of a sensor of the transportation vehicle.

4. The method of claim 3, further comprising determining the landmarks to be observed in future based on the determined future visibility ranges.

5. The method of claim 4, wherein the quality of localization in the self-localization of the transportation vehicle is determined based on the number of landmarks to be observed in the future.

6. The method of claim 4, wherein the quality of localization is determined through statistical evaluation of the landmarks to be observed in the future, taking account of the positions of the landmarks in relation to one another.

7. The method of claim 6, wherein a covariance of the positions of the landmarks which are to be observed in relation to one another is calculated for the statistical evaluation of the landmarks to be observed in the future.

8. A device for estimating a quality of localization in a self-localization of a transportation vehicle in which a map of a surrounding area is used for the self-localization, the map being used in controlling the transportation vehicle, wherein the device comprises:
at least one processor device configured to carry out a method comprising:
while the transportation vehicle is driving on a road, attempting to detect a number of landmarks recorded in the map of the surrounding area using sensors;
determining a position of the transportation vehicle from positions of the number of landmarks;
determining a future visibility of landmarks by:
detecting obstacles which restrict the visibility of landmarks, wherein detecting the obstacles comprises detecting moving obstacles on the roadway and optionally in the surrounding area of the roadway using sensors;
estimating movement trajectories of the moving obstacles; and
recording projected positions of the moving obstacles in the map of the surrounding area; and
estimating the quality of localization in the self-localization of the transportation vehicle based on the visibility of the landmarks.

9. A transportation vehicle, comprising the device of claim 8.

10. A non-transitory computer readable medium including computer program code which, when executed in a processor device, carries out the method of claim 1.

11. The device of claim 8, wherein recording the projected positions of the moving obstacles in the map of the surrounding area comprises recording a spatial extent of the moving obstacles.

12. The device of claim 8, wherein determining the future visibility of landmarks further comprises estimating a future visibility range of a sensor of the transportation vehicle.

13. The device of claim 12, wherein the at least one processor is further configured to determine the landmarks to be observed in future based on the determined future visibility ranges.

14. The device of claim 13, wherein the quality of localization in the self-localization of the transportation vehicle is determined based on the number of landmarks to be observed in the future.

15. The device of claim 13, wherein the quality of localization is determined through statistical evaluation of the landmarks to be observed in the future, taking account of the positions of the landmarks in relation to one another.

16. The device of claim 15, wherein a covariance of the positions of the landmarks which are to be observed in relation to one another is calculated for the statistical evaluation of the landmarks to be observed in the future.

* * * * *